(12) United States Patent
Gajic (10) Patent No.: US 11,454,095 B1
(45) Date of Patent: Sep. 27, 2022

(54) DOWNHOLE POWER AND COMMUNICATIONS SYSTEM(S) AND METHOD(S) OF USING SAME

(71) Applicant: Bosko Gajic, Kingwood, TX (US)

(72) Inventor: Bosko Gajic, Kingwood, TX (US)

( * ) Notice: Subject to any disclaimer, the term of this patent is extended or adjusted under 35 U.S.C. 154(b) by 0 days.

(21) Appl. No.: 17/463,101

(22) Filed: Aug. 31, 2021

(51) Int. Cl.
  *E21B 41/00* (2006.01)
  *E21B 47/13* (2012.01)
  *H02N 11/00* (2006.01)

(52) U.S. Cl.
  CPC .......... *E21B 41/0085* (2013.01); *E21B 47/13* (2020.05); *H02N 11/002* (2013.01)

(58) Field of Classification Search
  CPC .... E21B 41/0085; E21B 47/13; H02N 11/002
  See application file for complete search history.

(56) References Cited

U.S. PATENT DOCUMENTS

| | | | |
|---|---|---|---|
| 10,113,399 B2* | 10/2018 | Hall | E21B 41/0085 |
| 10,472,934 B2* | 11/2019 | Marshall | F01D 15/10 |
| 11,035,205 B2* | 6/2021 | Gatzen | H02K 1/2786 |
| 2015/0107824 A1* | 4/2015 | Signorelli | E21B 41/0085 166/244.1 |
| 2016/0341013 A1* | 11/2016 | Hall | E21B 41/0085 |
| 2017/0051579 A1* | 2/2017 | Hay | E21B 17/042 |
| 2017/0241242 A1* | 8/2017 | Marshall | F01D 5/06 |
| 2017/0284219 A1* | 10/2017 | Hunter | H02K 7/1823 |

\* cited by examiner

*Primary Examiner* — Brad Harcourt
(74) *Attorney, Agent, or Firm* — Haynes and Boone, LLP (57) ABSTRACT

Apparatus, method(s), and system(s) according to which electric power is generated in one or more coils by rotating a magnetic field generated by one or more permanent magnets. The one or more coils are connected to a collar. The collar is positioned downhole in an oil and gas wellbore. The one or more permanent magnets are connected to a rotor positioned within an internal passageway of the collar. A fluid is communicated along the internal passageway of the collar. The rotor, and thus the magnetic field generated by the one or more permanent magnets, are rotated using the fluid communicated along the internal passage.

24 Claims, 4 Drawing Sheets

DOWNHOLE POWER AND COMMUNICATIONS SYSTEM(S) AND METHOD(S) OF USING SAME

TECHNICAL FIELD

This application relates generally to downhole tool(s) used in oil and gas wellbore operations, and, more particularly, to downhole power and communications system(s), apparatus(es), and method(s) of using same.

BACKGROUND

In some instances, measurement-while-drilling ("MWD") and logging-while-drilling ("LWD") tools are powered by a downhole turbine in the course of an oil and gas wellbore operation (e.g., a drilling operation). Existing turbines are probe-based, meaning that power-generating coil(s) (e.g., a generator or electric motor component(s)) is/are placed inside a probe housing, which is centered within an internal passage of a collar. The MWD/LWD tools are also often placed within the probe housing. A rotor portion of the probe also generally includes radially-extending blades adapted to rotate in response to an axial flow of fluid through the internal passage of the collar. Such a conventional configuration requires various complex seals between the rotor and the rest of the probe. Additionally, for various MWD/LWD tools it is desirable to deliver power to the collar portion of the tool. In order to transfer power generated by the coil(s) and data collected by the MWD/LWD tools within the probe housing to the collar, such a conventional configuration requires "crossover" wires (accompanied by various complex mechanical components) where the probe wires must cross the path of the fluid flow while remaining protectively encased in a mechanical housing. For various reasons, it would be desirable to eliminate the need for such crossover wires and the complex seals in downhole turbines. Therefore, what is needed is/are apparatus(es), system(s), and/or method(s) to address these and other problems in the design of downhole power generation equipment.

DETAILED DESCRIPTION OF PREFERRED EMBODIMENTS

Figure 1:
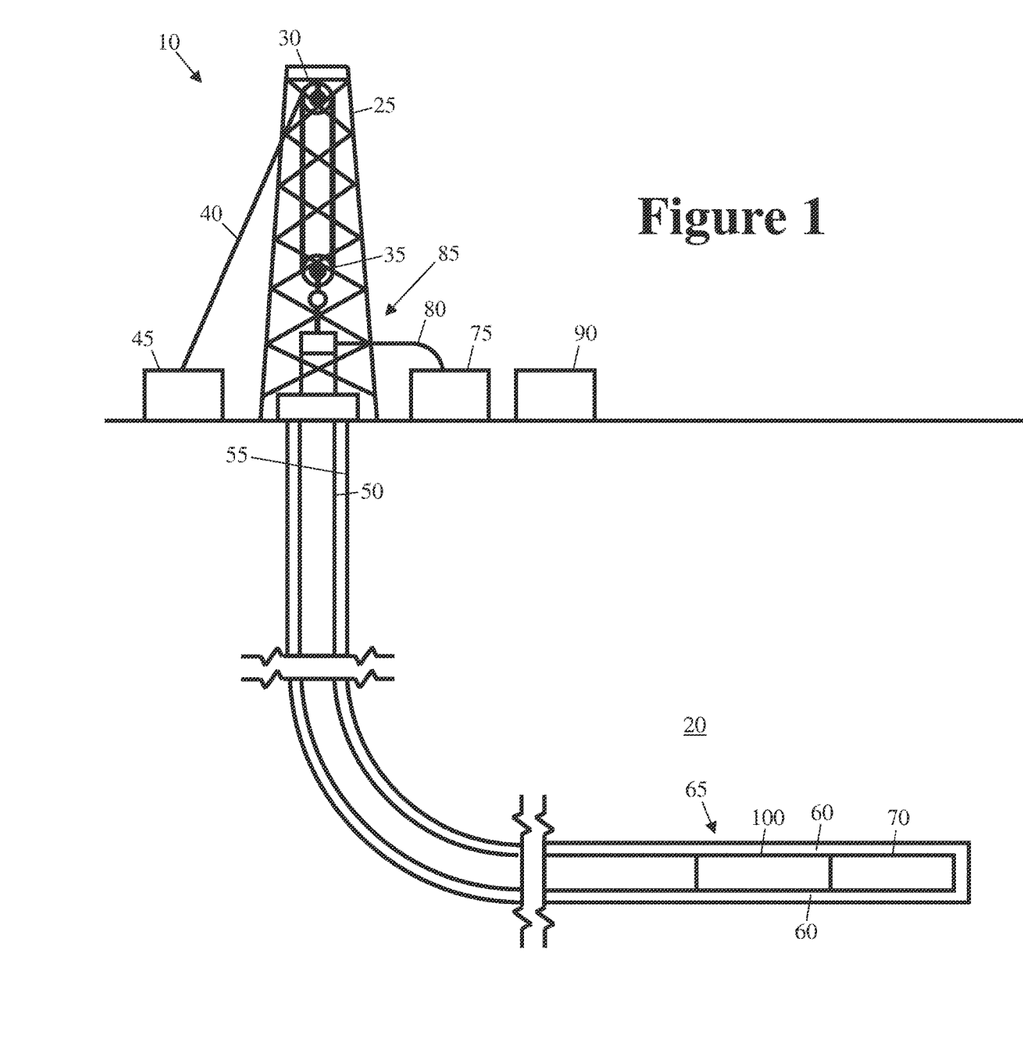
FIG. 1 is a schematic illustration of an oil and gas wellsite including a wellbore extending from a surface through one or more subterranean formations, and a bottom-hole assembly operably coupled to a conveyance string in the wellbore, according to one or more embodiments.

Referring to FIG. 1, in an embodiment, an oil and gas well system is generally referred to by reference numeral 10. Well system 10 includes a mast 25 positioned over one or more subterranean oil and gas formation(s) 20. The mast 25 supports lifting gear, which lifting gear includes a crown block 30 and a travel block 35. The crown block 30 is connected to the mast 25 at or near a top portion of the mast 25. The travel block 35 hangs from the crown block 30 by a drilling line 40, which drilling line 40 extends from the lifting gear to drawworks 45. The drawworks 45 are configured to reel out and reel in the drilling line 40, causing the travel block 35 to be lowered and raised, respectively, relative to the mast 25. A conveyance string 50 is connected to the travel block 35 and suspended within a wellbore 55 that extends from a surface location through various earth strata, including the formation(s) 20. For example, the wellbore 55 may include a casing string (not shown) cemented in at least a portion thereof. An annulus 60 is defined between the conveyance string 50 and the wellbore 55.

A bottom-hole assembly 65 is connected to the conveyance string 50 at the distal (or downhole) end portion of the conveyance string 50. In one or more embodiments, as in FIG. 1, the bottom-hole assembly 65 includes a drilling tool 70 (including, e.g., a drill bit and a mud motor) and a downhole power and communications system 100. In such embodiments, one or more mud pump(s) 75 are adapted to deliver drilling mud through a conduit 80 to the conveyance string 50, and, ultimately, to the drilling tool 70 in the wellbore 55. Additionally, in such embodiments, a drive system 85 (e.g., a top-drive, a rotary table, another drive system, or the like) is adapted to rotate the conveyance string 50 while applying weight-on-bit to the drilling tool 70 (via the conveyance string 50).

Although described as being part of the bottom-hole assembly 65 in combination with the drilling tool 70, the drilling tool 70 may instead be omitted from the bottom-hole assembly, in which case the bottom-hole assembly 65 can be re-purposed for another downhole operation other than drilling, e.g., casing operations, or, rather than being incorporated into the bottom-hole assembly 65, the system 100 may instead be incorporated into any one of a wide variety of differently-purposed bottom-hole assembl(ies), downhole tool(s), etc.

A control system 90 is adapted to control (or assist with controlling) one or more components of the well system 10. For example, the control system 90 may be adapted to transmit control signals to the drawworks 45, the drive system 85, the mud pump(s) 75, and/or the bottom-hole assembly 65 (including the drilling tool 70 and/or the system 100). In one or more embodiments, the control system 90 is or includes a non-transitory computer readable medium and one or more processors adapted to execute instructions stored on the non-transitory computer readable medium. In one or more embodiments, the control system 90 is located on-site at the well site. Alternatively, the control system 90 may be located remotely from the well site. In one or more embodiments, the control system 90 includes a plurality of controllers. In one or more embodiments, the control system 90 includes a plurality of controllers, with one or more controllers located on-site at the well site and/or one or more other controllers located remotely from the well site.

Figure 2:
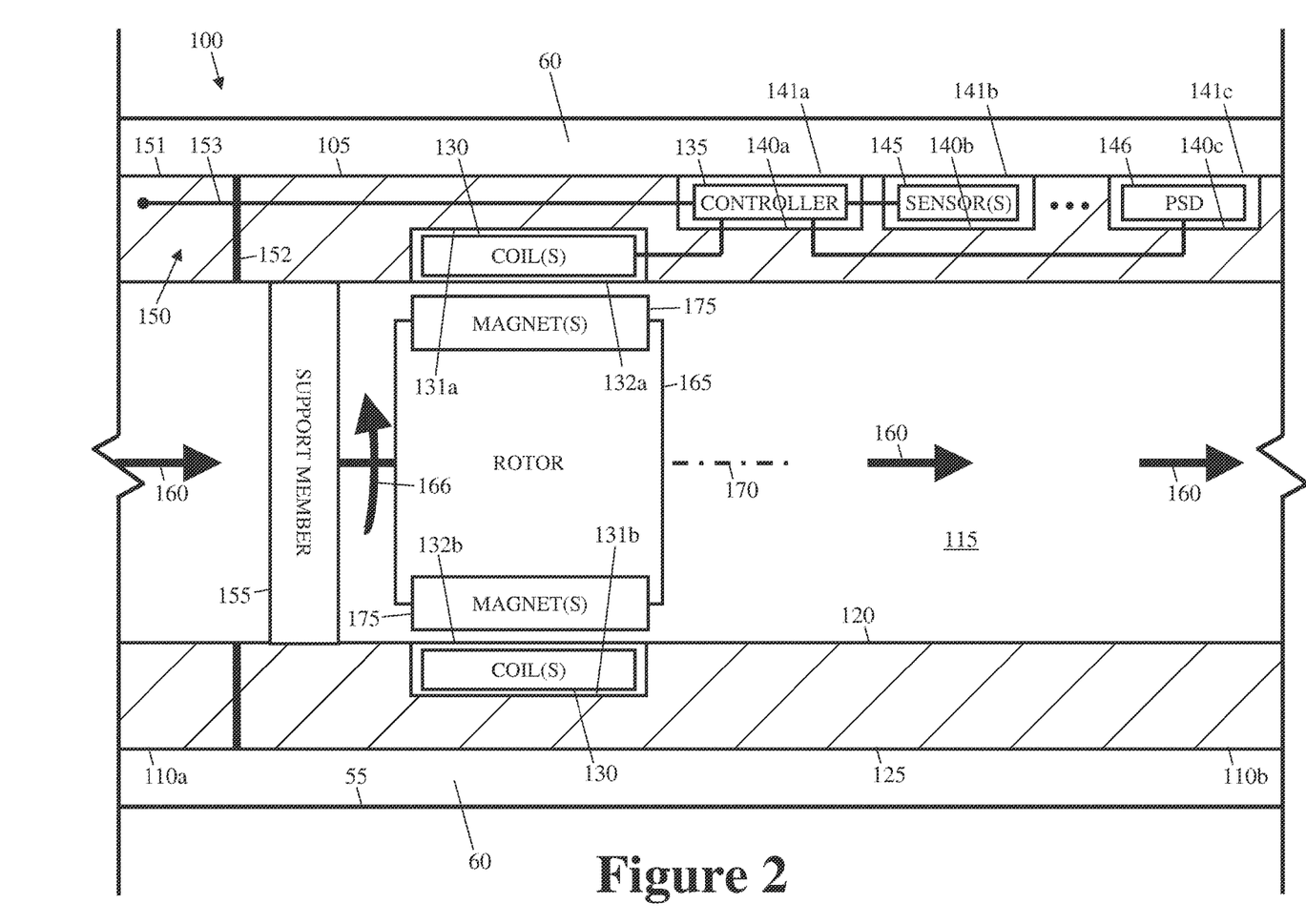
FIG. 2 is a diagrammatic illustration of a downhole power and communications system of the bottom-hole assembly of FIG. 1, according to one or more embodiments.

Referring to FIG. 2, in an embodiment, the downhole power system is generally referred to by the reference numeral 100. The system 100 includes a collar 105 adapted to be positioned in the wellbore 55; when so positioned in the wellbore 55, the collar 105 defines an uphole end portion 110a, a downhole end portion 110b, and an internal passageway 115 extending through the collar 105 from the uphole end portion 110a to the downhole end portion 110b. The internal passageway 115 defines an inside surface 120 of the collar 105. The collar 105 also defines an outside surface 125. One or more coil(s) 130 are connected to the collar 105 along the inside surface 120. For example, the coil(s) 130 may be at least partially embedded into the inside surface 120 of the collar 105 (or even fulling embedded with a radially innermost surface of the coil(s) 130 being flush with the inside surface 120). For example, the coil(s) 130 may be at least partially received within internal pockets 131*a-b* formed in the inside surface 120 of the collar 105. As shown, the internal packets 131*a-b* are radially internal. Covers 132*a-b* are connectable to the collar 105 over the internal pockets 131*a-b*, respectively, to contain the coil(s) 130 within the internal pockets 131*a-b*, and to seal the internal pockets 131*a-b* from fluid(s) in the annulus internal passageway 115. In one or more embodiments, the coil(s) 130 may be surrounded by epoxy (or another electrically insulative material) within the internal pockets 131*a-b*. In one or more embodiments, the coil(s) 130 are part of the collar 105. In addition, or instead, in one or more embodiments, the coil(s) 130 are part of a "stator" of the system 100, which "stator" may be or include at least a portion of the collar 105. In one or more embodiments, the internal pockets 131*a-b* are combined into a single (e.g., annular) internal pocket, and the corresponding covers 132*a-b* are combined into a single (e.g., annular) cover.

A controller 135 is connected to the collar 105 along the outside surface 125. For example, the controller 135 may be at least partially received within an external pocket 140*a* formed in the outside surface 125 of the collar 105. As shown, the external pocket 140*a* is radially external. A cover 141*a* is connectable to the collar 105 over the external pocket 140*a* to contain the controller 135 within the external pocket 140*a*, and to seal the external pocket 140*a* from fluid(s) in the annulus 60. In one or more embodiments, the controller 135 is part of the collar 105. The controller 135 is connected to, and adapted to receive electric power from, the coil(s) 130. In one or more embodiments, the controller 135 is or includes a non-transitory computer readable medium and one or more processors adapted to execute instructions stored on the non-transitory computer readable medium. In one or more embodiments, the controller 135 includes a plurality of controllers.

One or more sensor(s) 145 are also connected to the collar 105 along the outside surface 125. For example, the sensor(s) 145 may be at least partially received within an external pocket 140*b* formed in the outside surface 125 of the collar 105. As shown, the external pocket 140*b* is radially external. A cover 141*b* is connectable to the collar 105 over the external pocket 140*b* to contain the sensor(s) 145 within the external pocket 140*b*, and to seal the external pocket 140*b* from fluid(s) in the annulus 60. In one or more embodiments, the sensor(s) 145 are part of the collar 105. The sensor(s) 145 are connected to, and adapted to be in electrical communication with, the controller 135. The sensor(s) 145 are further adapted to receive electric power from the coil(s) 130, via the controller 135. In addition, or instead, the sensor(s) 145 may be connected to, and adapted to receive electric power directly from, the coil(s) 130.

A power storage device 146 (a battery, a capacitor, another power storage device, the like, or any combination thereof) is also connected to the collar 105 along the outside surface 125. For example, the power storage device 146 may be at least partially received within an external pocket 140*c* formed in the outside surface 125 of the collar 105. As shown, the pocket 140*c* is radially external. A cover 141*c* is connectable to the collar 105 over the external pocket 140*c* to contain the power storage device 146 within the external pocket 140*c*, and to seal the external pocket 140*c* from fluid(s) in the annulus 60. In one or more embodiments, the power storage device 146 is part of the collar 105. The power storage device 146 is connected to, and adapted to be in electrical communication with, the controller 135. The power storage device 146 is further adapted to receive and store electric power from the coil(s) 130, via the controller 135. In addition, or instead, the power storage device 146 may be connected to, and adapted to receive electric power directly from, the coil(s) 130.

Although described as being positioned in the separate external pockets 140*a-c*, the controller 135, the sensor(s) 145, the power storage device 146, or any combination thereof may be positioned together within the external pocket 140*a*, the external pocket 140*b*, or the external pocket 140*c*. In addition, or instead, in one or more embodiments, any combination of the external pockets 140*a-c* may be combined into a single external pocket; in such instances, a corresponding combination of the covers 141*a-c* are combined into a single cover. Alternatively, the external pockets 140*a-c* and the covers 141*a-c*, may be omitted in favor of internal pocket(s) formed in the inside surface 120, and internal cover(s) connectable over the internal pocket(s) to seal the internal pocket(s) from fluids in the internal passageway 115.

In one or more embodiments, as indicated by the ellipsis (" . . . ") in FIG. 2, any number of additional sensor(s) substantially similar to (or different from) the sensor(s) 145 can be connected to the collar 105 along the outside surface 125, which additional sensor(s) are also connected to, and adapted to be in electrical communication with, the controller 135 and/or the coil(s) 130. In addition, or instead, in one or more embodiments, as indicated by the ellipsis (" . . . ") in FIG. 2, any number of additional power storage device(s) substantially similar to (or different from) the power storage device 146 can be connected to the collar 105 along the outside surface 125, which additional power storage device(s) are also connected to, and adapted to be in electrical communication with, the controller 135 and/or the coil(s) 130. The number and arrangement along the collar 105 of these components, i.e., the controller 135, the sensor(s) 145 (and, optionally, the additional sensor(s)), and the power storage device 146 (and, optionally, the additionally power storage device(s)), may be varied.

In one or more embodiments, the sensor(s) 145, the additional sensor(s), or any combination thereof, is/are, include, or is/are part of, but is/are not limited to, MWD tool(s) and/or LWD tool(s). The MWD tool(s) measure the physical properties of the wellbore 55 during drilling operations, such as, for example, pressure, temperature, and wellbore trajectory in three-dimensional space. The MWD tool(s) are capable of establishing the depth, bottom-hole location, and orientation of the drilling tool 70 and the bottom-hole assembly 65. Further, the MWD tool(s) provide a range of measurements of the conveyance string 50, the bottom-hole assembly 65, and the wellbore 55, including, but not limited to: forces acting on the conveyance string 50 and the bottom-hole assembly 65; static and dynamic pressures within the drill string 50 and the annulus 60; and the size and shape of the wellbore 55. In contrast, the LWD tool(s) are adapted to measure the physical properties of the formation 20 during drilling operations. The LWD tool(s) are capable of a variety of logging operations such as, for example, density logging, gamma ray logging, resistivity logging, and sonic velocity logging, among others. These logging operations are utilized to determine a range of geological characteristics including, but not limited to, the density, porosity, resistivity, and lithology of the various earth strata and the formation 20.

A telemetry system 150 is also connected to the collar 105. For example, the telemetry system 150 may be at least partially embedded within the collar 105. In one or more embodiments, the telemetry system 150 is part of the collar 105. In one or more embodiments, as in FIG. 2, the telemetry system 150 is or includes an electromagnetic ("EM") telemetry system. The telemetry system 150 is connected to, and adapted to be in electrical communication with, the controller 135. The telemetry system 150 is further adapted to receive electric power from the coil(s) 130, via the controller 135. In addition, or instead, the telemetry system 150 may be connected to, and adapted to receive electric power directly from, the coil(s) 130. In one or more embodiments in which the telemetry system 150 is or includes the EM telemetry system, the telemetry system 150 includes a gap sub 151 incorporated into the collar 105. The gap sub 151 is separated from the rest of the collar 105 by an electrically insulative material 152, which electrically insulative material 152 provides an electrical break in the collar 105. Electrical power is modulated on both sides of the gap sub 151 via a conductor 153 crossing from one side of the electrically insulative material 152 to the other, and into contact with the gap sub 151, thereby generating an EM telemetry signal. More particularly, the electrically insulative material 152 allows the conductor 153 to conduct a different electrical signal onto the gap sub 151 than that conducted onto the rest of the collar 105; this difference generates the EM telemetry signal. In one or more embodiments, integrating the gap sub 151 into the collar 105 makes the telemetry system 150 more compact.

Although described herein and shown in FIG. 2 as an EM telemetry system, in addition, or instead, the telemetry system may be, include, or be part of a mud pulse telemetry system, a wired telemetry system, another type of telemetry system, the like, or any combination thereof. Alternatively, in one or more embodiments, the telemetry system 150 is omitted and the system 100 is operated as a memory-only tool (with data being retrieved from the memory-only tool only after tripping the drill string and the memory-only tool out of the wellbore 55). In one or more embodiments, the controller 135, the sensor(s) 145, the power storage device 146, the telemetry system 150, or any combination thereof, is/are, include, or is/are part of the MWD tool(s). In addition, or instead, in one or more embodiments, the controller 135, the sensor(s) 145, the power storage device 146, the telemetry system 150, or any combination thereof, is/are, include, or is/are part of the LWD tool(s).

In one or more embodiments, the power storage device 146 provides supplemental power to the controller 135, the sensor(s) 145, the telemetry system 150, or any combination thereof, when the fluid flow 160 through the internal passageway 115 is decreased below a threshold. The threshold may be pre-selected or it may be automatically set, e.g., based on power needs for a given function in view of downhole operations and/or other downhole conditions. For example, the fluid flow 160 through the internal passageway 115 may be decreased below the threshold to allow the sensor(s) 145 to take a survey (e.g., a directional survey) while the drilling tool 70 is relatively still. In such instances, the coil(s) 130 provide little or no power due to the decreased fluid flow 160 through the internal passageway 115, and the power storage device 146 provides additional power to supplement that provided by the coil(s) 130 (if any), which additional power runs one or more of the controller 135, the sensor(s) 145, and/or the telemetry system 150. As a result, in operation, the power storage device 146 is generally used to provide power for taking the survey (using the controller 135 and the sensor(s) 145) while the drilling tool 70 is relatively still. In one or more embodiments, both the power storage device 146 and the coil(s) 130 are used to provide power for taking the survey, with the power storage device 146 providing relatively more power than the coil(s) 130. Thereafter, once the fluid flow 160 through the internal passageway 115 is restored to a level above the threshold, the coil(s) 130 are generally used to provide power for performing telemetry in order to communicate the survey results to the surface (using the controller 135 and the telemetry system 150), resulting in a much stronger telemetry signal than in battery-only systems. In one or more embodiments, both the coil(s) 130 and the power storage device 146 are used to provide power for performing telemetry, with the coil(s) 130 providing relatively more power than the power storage device 146.

The system 100 also includes a support member 155 positioned within the internal passageway 115 of the collar 105 and fixedly connected to the inside surface 120 of the collar 105. The support member 155 permits fluid flow therethrough and along the internal passageway 115, as indicated by arrows 160. A rotor 165 is also positioned within the internal passageway 115 of the collar 105. The rotor 165 is rotationally connected to the support member 155. Additionally, the rotor 165 includes one or more radially-extending blades (or other flow-receiving members) that cause the rotor 165 to rotate relative to the support member 155, as indicated by arrow 166, and about a central axis 170 in response to a fluid flowing (as indicated by the arrows 160) through the internal passageway 115. For example, support member 155 may be or include a bearing that rotationally supports the rotor 165 within the fluid flow 160. Additionally, although shown as being located relatively closer to the uphole end portion 110a of the collar 105 than the rotor 165, the support member 155 may instead be positioned relatively closer to the downhole end portion 110b of the collar 105. In either case, the central axis 170 about which the rotor 165 is adapted to rotate is substantially parallel to, or coaxial with, the internal passageway 115 (and thus a direction of fluid flow within the internal passageway 115). One or more permanent magnet(s) 175 are connected to the rotor 165 along a radially outward periphery of the rotor 165. For example, the permanent magnet(s) 175 may be at least partially embedded into the radially outward periphery of the rotor 165 (or even fulling embedded with a radially outermost surface of the permanent magnet(s) 175 being flush with the radially outward periphery of the rotor 165). In one or more embodiments, the permanent magnet(s) 175 are part of the rotor 165.

Figure 3:
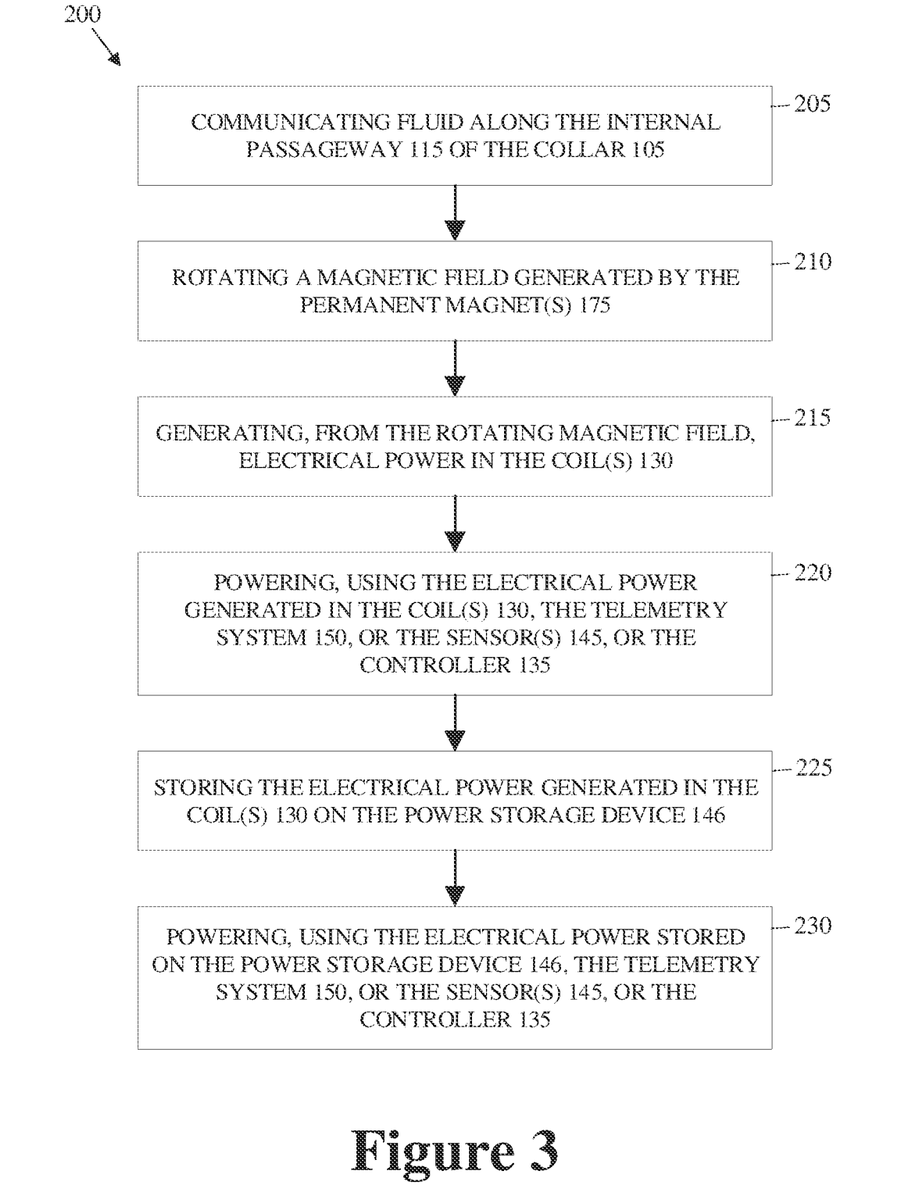
FIG. 3 is a flow diagram illustrating a method for powering one or more downhole tools using the downhole power and communications system of FIG. 2, according to one or more embodiments.

Referring to FIG. 3, in an embodiment, a method of powering one or more downhole tools using the system 100 is generally referred to by the reference numeral 200. The method 200 includes: at a step 205, communicating fluid along the internal passageway 115 of the collar 105; at a step 210, rotating a magnetic field generated by the permanent magnet(s) 175; at a step 215, generating, from the rotating magnetic field, electric power in the coil(s) 130; at a step 220, powering, using the electric power generated in the coil(s) 130, the telemetry system 150, or the sensor(s) 145, or the controller 135; at a step 225, storing the electric power generated in the coil(s) 130 on the power storage device 146; and, at a step 230, powering, using the electric power stored on the power storage device 146, the telemetry system 150, or the sensor(s) 145, or the controller 135. In one or more embodiments, the step 210 of rotating the magnetic field generated by the permanent magnet(s) 175 comprises rotating the rotor 165 using the fluid communicated along the internal passage 115.

In one or more embodiments, the operation of the system 100 and/or the execution of the method 200 eliminates the need for crossover wires (and the accompanying complex seals) in downhole turbines, among other things.

Figure 4:
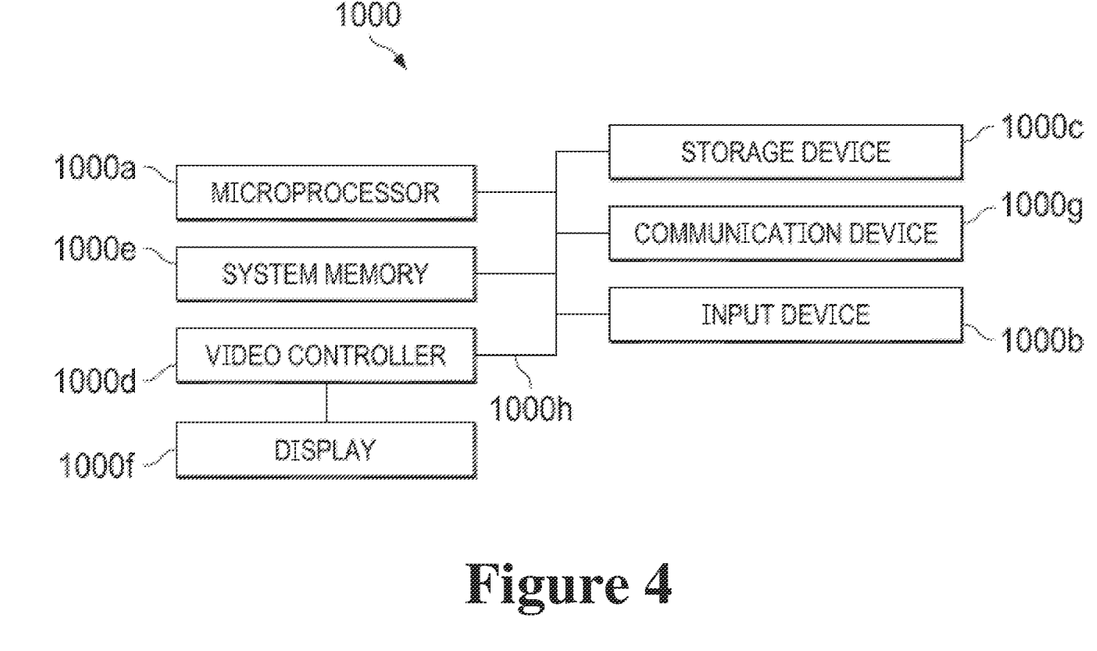
FIG. 4 is a diagrammatic illustration of a computing node for implementing one or more embodiments of the present disclosure.

Referring to FIG. 4, with continuing reference to FIGS. 1 through 3, an illustrative node 1000 for implementing embodiment(s) of one or more of the control system(s) (e.g., the control system 90), controller(s) (e.g., the controller 135), element(s), apparatus, system(s) (e.g., the system 10, the system 100), method(s) (e.g., the method 200), step(s), or any combination thereof, described above and/or illustrated in FIGS. 1 through 3, is depicted. The node 1000 includes a microprocessor 1000a, an input device 1000b, a storage device 1000c, a video controller 135 1000d, a system memory 1000e, a display 1000f, and a communication device 1000g all interconnected by one or more buses 1000h. In one or more embodiments, the storage device 1000c may include a hard drive, CD-ROM, optical drive, any other form of storage device and/or any combination thereof. In one or more embodiments, the storage device 1000c may include, and/or be capable of receiving, a CD-ROM, DVD-ROM, or any other form of non-transitory computer-readable medium that may contain executable instructions. In one or more embodiments, the communication device 1000g may include a modem, network card, or any other device to enable the node 1000 to communicate with other node(s). In one or more embodiments, the node and the other node(s) represent a plurality of interconnected (whether by intranet or Internet) computer systems, including without limitation, personal computers, mainframes, PDAs, smartphones and cell phones.

In one or more embodiments, one or more of the embodiments described above and/or illustrated in FIGS. 1 through 3 include at least the node 1000 and/or components thereof, and/or one or more nodes that are substantially similar to the node 1000 and/or components thereof. In one or more embodiments, one or more of the above-described components of the node 1000 and/or the embodiments described above and/or illustrated in FIGS. 1 through 3 include respective pluralities of same components.

In one or more embodiments, one or more of the embodiments described above and/or illustrated in FIGS. 1 through 3 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in one or more embodiments pulls real-time information from one or more servers, automatically refreshing with latest information at a predetermined time increment; or any combination thereof.

In one or more embodiments, a computer system typically includes at least hardware capable of executing machine readable instructions, as well as the software for executing acts (typically machine-readable instructions) that produce a desired result. In one or more embodiments, a computer system may include hybrids of hardware and software, as well as computer sub-systems.

In one or more embodiments, hardware generally includes at least processor-capable platforms, such as client-machines (also known as personal computers or servers), and hand-held processing devices (such as smart phones, tablet computers, or personal computing devices (PCDs), for example). In one or more embodiments, hardware may include any physical device that is capable of storing machine-readable instructions, such as memory or other data storage devices. In one or more embodiments, other forms of hardware include hardware sub-systems, including transfer devices such as modems, modem cards, ports, and port cards, for example.

In one or more embodiments, software includes any machine code stored in any memory medium, such as RAM or ROM, and machine code stored on other devices (such as floppy disks, flash memory, or a CD-ROM, for example). In one or more embodiments, software may include source or object code. In one or more embodiments, software encompasses any set of instructions capable of being executed on a node such as, for example, on a client machine or server.

In one or more embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In one or more embodiments, computer readable media include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In one or more embodiments, data structures are defined organizations of data that may enable an embodiment of the present disclosure. In an embodiment, a data structure may provide an organization of data, or an organization of executable code.

In one or more embodiments, any networks and/or one or more portions thereof may be designed to work on any specific architecture. In an embodiment, one or more portions of any networks may be executed on a single computer, local area networks, client-server networks, wide area networks, internets, hand-held and other portable and wireless devices and networks.

In one or more embodiments, a database may be any standard or proprietary database software. In one or more embodiments, the database may have fields, records, data, and other database elements that may be associated through database specific software. In one or more embodiments, data may be mapped. In one or more embodiments, mapping is the process of associating one data entry with another data entry. In an embodiment, the data contained in the location of a character file can be mapped to a field in a second table. In one or more embodiments, the physical location of the database is not limiting, and the database may be distributed. In an embodiment, the database may exist remotely from the server, and run on a separate platform. In an embodiment, the database may be accessible across the Internet. In one or more embodiments, more than one database may be implemented.

In one or more embodiments, a plurality of instructions stored on a computer readable medium may be executed by one or more processors to cause the one or more processors to carry out or implement in whole or in part one or more of the embodiment(s) of one or more of the control system(s) (e.g., the control system 90), controller(s) (e.g., the controller 135), element(s), apparatus, system(s) (e.g., the system 10, the system 100), method(s) (e.g., the method 200), step(s), or any combination thereof, described above and/or illustrated in FIGS. 1 through 3. In one or more embodiments, such a processor may include one or more of the microprocessor 1000*a*, any processor(s) that are part of the components of the system 10 (such as, for example, the control system 90), the system 100 (such as, for example, the controller 135), and/or any combination thereof, and such a computer readable medium may be distributed among one or more components of the system. In one or more embodiments, such a processor may execute the plurality of instructions in connection with a virtual computer system. In one or more embodiments, such a plurality of instructions may communicate directly with the one or more processors, and/or may interact with one or more operating systems, middleware, firmware, other applications, and/or any combination thereof, to cause the one or more processors to execute the instructions.

An apparatus has been disclosed. The apparatus generally includes: a collar adapted to be positioned downhole in a wellbore; a rotor disposed within an internal passageway of the collar and rotatable relative to the collar; one or more permanent magnets connected to the rotor, the one or more permanent magnets generating a magnetic field; and a coil connected to the collar and adapted to generate electric power from the rotating magnetic field. In one or more embodiments, the apparatus further includes: a telemetry system connected to the collar and adapted to be powered using the electric power generated in the coil; or one or more sensors connected to the collar and adapted to be powered using the electric power generated in the coil; or a controller connected to the collar and adapted to be powered using the electric power generated in the coil; or any combination thereof. In one or more embodiments, the apparatus includes: the telemetry system connected to the collar and adapted to be powered using the electric power generated in the coil; and the controller connected to the collar and adapted to be powered using the electric power generated in the coil; wherein the telemetry system is connected to the controller; and wherein the controller is further adapted to send data and/or control signals to the telemetry system. In one or more embodiments, the apparatus further includes: a power storage device connected to the collar and adapted to store at least a portion of the electric power generated in the coil. In one or more embodiments, the apparatus further includes: a telemetry system connected to the collar and adapted to be powered using the electric power stored on the power storage device; or one or more sensors connected to the collar and adapted to be powered using the electric power stored on the power storage device; or a controller connected to the collar and adapted to be powered using the electric power stored on the power storage device; or any combination thereof. In one or more embodiments, the apparatus includes: the one or more sensors connected to the collar and adapted to be powered using the electric power stored on the power storage device; and the controller connected to the collar and adapted to be powered using the electric power stored on the power storage device; wherein the one or more sensors are connected to the controller; and wherein the controller is further adapted to receive data from the one or more sensors. In one or more embodiments, when the collar is positioned downhole in the wellbore, fluid is communicable along the internal passageway of the collar; and the rotor is rotatable relative to the collar using the fluid communicated along the internal passage.

A method of generating electric power in a wellbore has also been disclosed. The method generally includes: rotating a magnetic field generated by one or more permanent magnets, the one or more permanent magnets being connected to a rotor positioned within an internal passageway of a collar, and the collar being positioned downhole in the wellbore; and generating, from the rotating magnetic field, electric power in one or more coils connected to the collar. In one or more embodiments, the method further includes: powering, using the electric power generated in the one or more coils: a telemetry system connected to the collar; or one or more sensors connected to the collar; or a controller connected to the collar; or any combination thereof. In one or more embodiments, the method includes powering, using the electric power generated in the one or more coils: the telemetry system connected to the collar; and the controller connected to the collar; wherein the telemetry system is connected to the controller; and wherein the method further includes sending data and/or control signals from the controller to the telemetry system. In one or more embodiments, the method further includes: storing at least a portion of the electric power generated in the one or more coils on a power storage device connected to the collar. In one or more embodiments, the method further includes: powering, using the electric power stored on the power storage device: a telemetry system connected to the collar; or one or more sensors connected to the collar; or a controller connected to the collar; or any combination thereof. In one or more embodiments, the method includes powering, using the electric power stored on the power storage device: the one or more sensors connected to the collar; and the controller connected to the collar; wherein the one or more sensors are connected to the controller; and wherein the method further includes receiving, using the controller, data from the one or more sensors. In one or more embodiments, the method further includes: communicating fluid along the internal passageway of the collar; wherein rotating the magnetic field generated by the one or more permanent magnets includes rotating the rotor using the fluid communicated along the internal passage.

A system has also been disclosed. The system generally includes: one or more non-transitory computer readable media; and a plurality of instructions stored on the one or more non-transitory computer readable media and executable by one or more processors operably associated therewith to perform the following operation(s): rotating a magnetic field generated by one or more permanent magnets, the one or more permanent magnets being connected to a rotor positioned within an internal passageway of a collar, and the collar being positioned downhole in a wellbore; and generating, from the rotating magnetic field, electric power in one or more coils connected to the collar. In one or more embodiments, the instructions are executable by the one or more processors to perform the following additional operation(s): powering, using the electric power generated in the one or more coils: a telemetry system connected to the collar; or one or more sensors connected to the collar; or a controller connected to the collar; or any combination thereof. In one or more embodiments, the instructions are executable by the one or more processors to perform the following operation(s): powering, using the electric power generated in the one or more coils: the telemetry system connected to the collar; and the controller connected to the collar; wherein the telemetry system is connected to the controller; and wherein the instructions are executable by the one or more processors to perform the following additional operation(s): sending data and/or control signals from the controller to the telemetry system. In one or more embodiments, the instructions are executable by the one or more processors to perform the following additional operation(s): storing at least a portion of the electric power generated in the one or more coils on a power storage device connected to the collar. In one or more embodiments, the instructions are executable by the one or more processors to perform the following additional operation(s): powering, using the electric power stored on the power storage device: a telemetry system connected to the collar; or one or more sensors connected to the collar; or a controller connected to the collar; or any combination thereof. In one or more embodiments, the instructions are executable by the one or more processors to perform the following operation(s): powering, using the electric power stored on the power storage device: the one or more sensors connected to the collar; and the controller connected to the collar; wherein the one or more sensors are connected to the controller; and wherein the instructions are executable by the one or more processors to perform the following additional operation(s): receiving, using the controller, data from the one or more sensors. In one or more embodiments, the instructions are executable by the one or more processors to perform the following additional operation(s): communicating fluid along the internal passageway of the collar; and wherein rotating the magnetic field generated by the one or more permanent magnets includes rotating the rotor using the fluid communicated along the internal passage.

It is understood that variations may be made in the foregoing without departing from the scope of the present disclosure.

In one or more embodiments, the elements and teachings of the various embodiments may be combined in whole or in part in some (or all) of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only, may be relative to other features or references, and do not necessarily limit the specific orientation or location of the structure described above.

In one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. An apparatus, comprising:
   a collar adapted to be positioned downhole in a wellbore, the collar defining an internal passageway, which internal passageway defines an inside surface in the collar;
   a support member disposed within the internal passageway of the collar and rigidly connected to the inside surface of the collar;
   a rotor disposed within the internal passageway of the collar and rotationally connected to the support member so that the rotor is rotatable relative to the collar;
   one or more permanent magnets connected to the rotor, the one or more permanent magnets generating a magnetic field; and
   a coil connected to the collar and adapted to generate electric power from the rotating magnetic field, the coil being spaced radially outwardly from, and axially overlapping at least respective portion(s) of, the one or more permanent magnets,
   wherein, when the collar is positioned downhole in the wellbore, fluid is communicable along the internal passageway between the coil and at least one of the one or more permanent magnets.

2. The apparatus of claim 1, which further comprises:
   a telemetry system connected to the collar and adapted to be powered using the electric power generated in the coil; or
   one or more sensors connected to the collar and adapted to be powered using the electric power generated in the coil; or
   a controller connected to the collar and adapted to be powered using the electric power generated in the coil; or
   any combination thereof.

3. The apparatus of claim 2,
   wherein the apparatus comprises:
      the telemetry system connected to the collar and adapted to be powered using the electric power generated in the coil; and
      the controller connected to the collar and adapted to be powered using the electric power generated in the coil;
   wherein the telemetry system is connected to the controller; and
   wherein the controller is further adapted to send data and/or control signals to the telemetry system.

4. The apparatus of claim 1, which further comprises:
   a power storage device connected to the collar and adapted to store at least a portion of the electric power generated in the coil.

5. The apparatus of claim 4, which further comprises:
   a telemetry system connected to the collar and adapted to be powered using the electric power stored on the power storage device; or one or more sensors connected to the collar and adapted to be powered using the electric power stored on the power storage device; or
a controller connected to the collar and adapted to be powered using the electric power stored on the power storage device; or
any combination thereof.

6. The apparatus of claim 5,
wherein the apparatus comprises:
the one or more sensors connected to the collar and adapted to be powered using the electric power stored on the power storage device; and
the controller connected to the collar and adapted to be powered using the electric power stored on the power storage device;
wherein the one or more sensors are connected to the controller; and
wherein the controller is further adapted to receive data from the one or more sensors.

7. The apparatus of claim 1,
wherein the rotor includes one or more flow-receiving members adapted to rotate the rotor relative to the collar by receiving fluid communicated along the internal passageway.

8. The apparatus of claim 1,
wherein, when the collar is positioned downhole in the wellbore, the fluid is communicable along the internal passageway radially between the coil and the at least one of the one or more permanent magnets.

9. A method of generating electric power in a wellbore, the method comprising:
rotating a magnetic field generated by one or more permanent magnets, the one or more permanent magnets being connected to a rotor positioned within an internal passageway of a collar, the rotor being rotationally connected to a support member positioned within the internal passageway so that the rotor is rotatable relative to the collar, the internal passageway defining an inside surface in the collar, the support member being rigidly connected to the inside surface of the collar, and the collar being positioned downhole in the wellbore; and
generating, from the rotating magnetic field, electric power in one or more coils connected to the collar, the one or more coils being spaced radially outwardly from, and axially overlapping at least respective portion(s) of, the one or more permanent magnets,
wherein rotating the magnetic field generated by the one or more permanent magnets comprises communicating fluid along the internal passageway, and
wherein at least a portion of the fluid communicated along the internal passageway flows between at least one of the one or more coils and at least one of the one or more permanent magnets.

10. The method of claim 9, which further comprises:
powering, using the electric power generated in the one or more coils:
a telemetry system connected to the collar; or
one or more sensors connected to the collar; or
a controller connected to the collar; or
any combination thereof.

11. The method of claim 10,
wherein the method comprises powering, using the electric power generated in the one or more coils:
the telemetry system connected to the collar; and
the controller connected to the collar;
wherein the telemetry system is connected to the controller; and
wherein the method further comprises sending data and/or control signals from the controller to the telemetry system.

12. The method of claim 9, which further comprises:
storing at least a portion of the electric power generated in the one or more coils on a power storage device connected to the collar.

13. The method of claim 12, which further comprises:
powering, using the electric power stored on the power storage device:
a telemetry system connected to the collar; or
one or more sensors connected to the collar; or
a controller connected to the collar; or
any combination thereof.

14. The method of claim 13,
wherein the method comprises powering, using the electric power stored on the power storage device:
the one or more sensors connected to the collar; and
the controller connected to the collar;
wherein the one or more sensors are connected to the controller; and
wherein the method further comprises receiving, using the controller, data from the one or more sensors.

15. The method of claim 9,
wherein rotating the magnetic field generated by the one or more permanent magnets further comprises:
rotating the rotor relative to the collar by receiving, using one or more flow-receiving members of the rotor, fluid communicated along the internal passageway.

16. The method of claim 9,
wherein communicating the fluid along the internal passageway between the at least one of the one or more coils and the at least one of the one or more permanent magnets comprises communicating the fluid along the internal passageway radially between the at least one of the one or more coils and the at least one of the one or more permanent magnets.

17. A system, comprising:
one or more non-transitory computer readable media; and
a plurality of instructions stored on the one or more non-transitory computer readable media and executable by one or more processors operably associated therewith to perform the following operation(s):
rotating a magnetic field generated by one or more permanent magnets, the one or more permanent magnets being connected to a rotor positioned within an internal passageway of a collar, the rotor being rotationally connected to a support member positioned within the internal passageway so that the rotor is rotatable relative to the collar, the internal passageway defining an inside surface in the collar, the support member being rigidly connected to the inside surface of the collar, and the collar being positioned downhole in a wellbore; and
generating, from the rotating magnetic field, electric power in one or more coils connected to the collar, the one or more coils being spaced radially outwardly from, and axially overlapping at least respective portion(s) of, the one or more permanent magnets,
wherein rotating the magnetic field generated by the one or more permanent magnets comprises communicating fluid along the internal passageway, and wherein at least a portion of the fluid communicated along the internal passageway flow between at least one of the one or more coils and at least one of the one or more permanent magnets.

18. The system of claim 17, wherein the instructions are executable by the one or more processors to perform the following additional operation(s):
   powering, using the electric power generated in the one or more coils:
      a telemetry system connected to the collar; or
      one or more sensors connected to the collar; or
      a controller connected to the collar; or
      any combination thereof.

19. The system of claim 18,
   wherein the instructions are executable by the one or more processors to perform the following operation(s):
      powering, using the electric power generated in the one or more coils:
         the telemetry system connected to the collar; and
         the controller connected to the collar;
   wherein the telemetry system is connected to the controller; and
   wherein the instructions are executable by the one or more processors to perform the following additional operation(s):
      sending data and/or control signals from the controller to the telemetry system.

20. The system of claim 17, wherein the instructions are executable by the one or more processors to perform the following additional operation(s):
   storing at least a portion of the electric power generated in the one or more coils on a power storage device connected to the collar.

21. The system of claim 20, wherein the instructions are executable by the one or more processors to perform the following additional operation(s):
   powering, using the electric power stored on the power storage device:
      a telemetry system connected to the collar; or
      one or more sensors connected to the collar; or
      a controller connected to the collar; or
      any combination thereof.

22. The system of claim 21,
   wherein the instructions are executable by the one or more processors to perform the following operation(s):
      powering, using the electric power stored on the power storage device:
         the one or more sensors connected to the collar; and
         the controller connected to the collar;
   wherein the one or more sensors are connected to the controller; and
   wherein the instructions are executable by the one or more processors to perform the following additional operation(s):
      receiving, using the controller, data from the one or more sensors.

23. The system of claim 17,
   wherein rotating the magnetic field generated by the one or more permanent magnets further comprises:
      rotating the rotor relative to the collar by receiving, using one or more flow-receiving members of the rotor, fluid communicated along the internal passageway.

24. The system of claim 17,
   wherein communicating the fluid along the internal passageway between the at least one of the one or more coils and the at least one of the one or more permanent magnets comprises communicating the fluid along the internal passageway radially between the at least one of the one or more coils and the at least one of the one or more permanent magnets.

* * * * *